(12) United States Patent
Sturm et al.

(10) Patent No.: US 10,368,423 B2
(45) Date of Patent: Jul. 30, 2019

(54) BUS PROTOCOL FOR DYNAMIC LIGHTING APPLICATION

(71) Applicant: Melexis Technologies NV, Tessenderlo (BE)

(72) Inventors: Jorgen Sturm, Weimar (DE); Thomas Freitag, Plaue (DE); Raik Frost, Erfurt (DE); Michael Bender, Erfurt (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 16/174,411

(22) Filed: Oct. 30, 2018

(65) Prior Publication Data

US 2019/0132929 A1 May 2, 2019

(30) Foreign Application Priority Data

Oct. 30, 2017 (EP) ..................................... 17199162

(51) Int. Cl.
  H05B 33/08 (2006.01)
  H05B 37/02 (2006.01)
  (Continued)

(52) U.S. Cl.
  CPC ..... *H05B 37/0254* (2013.01); *H05B 33/0842* (2013.01); *B60Q 1/00* (2013.01);
  (Continued)

(58) Field of Classification Search
  None
  See application file for complete search history.

(56) References Cited

U.S. PATENT DOCUMENTS

| | | | |
|---|---|---|---|
| 8,492,983 B1 | 7/2013 | Berg et al. | |
| 2004/0158333 A1* | 8/2004 | Ha | H04B 3/542 700/3 |

(Continued)

FOREIGN PATENT DOCUMENTS

DE  102015222504 A1  5/2017

OTHER PUBLICATIONS

European Search Report from EP Application No. 17199162.3, dated Feb. 5, 2018.
(Continued)

*Primary Examiner* — Dedei K Hammond
(74) *Attorney, Agent, or Firm* — Workman Nydegger

(57) ABSTRACT

A method of operating a plurality of driving units for powering electronic units comprises interchanging a data frame including a bit sequence, between a master control unit and at least one of a plurality of driving units at slave nodes. A step of applying an ID field comprises indicating the driving unit address using a first bit sub-string comprising N bits, allowing the master control unit to identify whether data should be received or transmitted, or allowing each addressed driving unit to decode which action is required by the master control unit, using an R/T command bit, performing a length decoding step, for including information in the ID field regarding the type of instructions included in the data frame, using an F function bit, and assigning data bits to different electronic units or indicating in the length of the bit string in the data field, using a second bit sub-string.

18 Claims, 8 Drawing Sheets

(51) Int. Cl.
  *B60R 16/02*  (2006.01)
  *B60Q 1/00*  (2006.01)
  *B60R 16/023*  (2006.01)
  *H04L 12/40*  (2006.01)
  *H04L 29/08*  (2006.01)
(52) U.S. Cl.
  CPC .......... *B60R 16/0238* (2013.01); *H04L 67/12* (2013.01); *H04L 2012/40273* (2013.01)

(56) References Cited

U.S. PATENT DOCUMENTS

2005/0093488 A1* 5/2005 Hung .................. H05B 33/0842
  315/307
2012/0274236 A1* 11/2012 Lee .................... H05B 37/0272
  315/297

OTHER PUBLICATIONS

Wu et al., "A Design of Embedded DALI Controller," IEEE International Conference on Industrial Informatics, 2006, pp. 1237-1240.

* cited by examiner

BUS PROTOCOL FOR DYNAMIC LIGHTING APPLICATION

FIELD OF THE INVENTION

The invention relates to the field of illumination and signalization systems. More specifically it relates to control of LED clusters via data transmission.

BACKGROUND OF THE INVENTION

Illumination systems, amongst others those for light applications in cars, often make use of LED technology. LED technology typically advantageously is used since the production of LED illumination sources is inexpensive and the energy consumption of LED illumination sources is low.

Control of illumination systems in automotive applications should be robust and fail-proof. For example, it should not be affected by external fields, electric peaks or other sources of noise. However, automotive environments are electrically noisy. A faulty transmission of data, or unintended activation of illumination systems, can result in dangerous situations which should be avoided.

Existing systems typically provide connection between different LEDs and their controllers by LIN or CAN systems. The number of LEDs that can be controlled is quite limited in case of LIN. On the other hand, setting illumination systems directly in CAN is complex, difficult to repair or interchange in case of failure or accident, and the implementation is expensive.

Moreover, the existing implementations are prone to errors due to for example interference, electrostatic discharge or antenna effects. In order to reduce these effects document DE102015222504A1 discloses an implementation based on SPI or on unidirectional differential data bus, which reduces the influence of antenna effects due to for example influence of the power line or external influences. However, this protection is only partial, and it does not allow protection due to variations or irregularities in the LED controllers.

SUMMARY OF THE INVENTION

It is an object of embodiments of the present invention to provide a system for illumination, a bus protocol and an auto-addressing method, which provide a flexible communication network for robust transmission of instructions for powering electronic devices. It is an advantage of embodiments of the present invention that also a flexible communication network is obtained for transmission of diagnostics information, including checking that the data transmission did not contain unwanted changes at one or more stages of the data transmission.

The present invention relates to a method of operating a plurality of driving units for powering electronic units, the method comprising interchanging a data frame including a bit sequence, between a master control unit and at least one of a plurality of driving units at slave nodes, the sequence being divided in fields of consecutive bit strings, the method comprising:

applying an ID field for addressing at least one driving unit, for interchanging data between the master control unit and the at least one addressed driving unit, applying a data field comprising information and/or instructions regarding the status of the electronic units wherein applying the ID field further comprises:

indicating the driving unit address using a first bit sub-string comprising N bits, where $2^N$ is equal or higher than the number of driving units in the plurality of driving units, for applying the data field on the addressed driving unit or ignoring the data field if the driving unit is not addressed using a receive/transmit command bit for assigning values, for allowing the master control unit to identify whether data should be received from or transmitted to driving units, or for allowing each addressed driving unit to decode which action is required by the master control unit depending on the value assigned to the receive/transmit (R/T) command bit, using a further function bit including information in the ID field regarding the type of instructions included in the data frame, depending on the value assigned to the function bit, assigning data bits in a second bit sub-string to different electronic units or performing a length decoding step for indicating in the length of the bit string in the data field using that second bit sub-string.

It is an advantage of embodiments of the present invention that a fast and robust communication, with predictable bit sequence lengths, can be set between the MCU and each of the plurality of driving units simultaneously, including addressing of particular driving units. It is an advantage of embodiments of the present invention that a large number of slave nodes can be addressed e.g. up to 60 slave nodes. It is an advantage of embodiments of the present invention that a differential bus can be used. It is an advantage of embodiments of the present invention that a fast system is obtained. For example, in some applications, a speed of up to 750 kBaud can be obtained, resulting in an update cycle for the electronic units of 10 ms. The electronic units referred to may be LEDs although embodiments of the present invention are not limited thereto and the units may be for example any type of lighting devices or even more general any type of electronic device that need to be powered.

The method may further comprise including a cyclic redundancy check for detecting any unintentional change of the ID field and data field.

It is an advantage of embodiments of the present invention that a higher protection against noise and accidental variations of bits in the transmitted data is obtained at the level of bus protocol, which is especially critical in automotive environments.

The master control unit may send the sequence of bits to at least one of the driving units, the sequence including an acknowledgement field comprising a predetermined bit string sent by a slave node to the master control unit immediately before the end of frame field, for signalizing the master control unit that the received data string is correct if the predetermined bit string coincides with the expected value or values stored in the master control unit.

It is an advantage of embodiments of the present invention that not only driving information is provided but that there is also diagnostic information exchange. The system therefore operates in a bidirectional way, not only providing information from the master control unit to the drive units but also vice versa. It is an advantage of embodiments of the present invention that a diagnosis step is provided on data received by the drivers, which enables the MCU to signalize any problem in real time if a faulty data transmission has been sent to the driver units. The method may further use an end of frame being a stop bit of the transmission, e.g. UART transmission. The end of frame also can be of longer bit times, as for example 12 bit times.

It is an advantage of embodiments of the present invention that the sequence can be unambiguously finished, reducing chances of cross-talk between the MCU and an unaddressed driving unit.

The method may further include applying a break field, before the ID field, with a predetermined length. It is an advantage of embodiments of the present invention that any accidental voltage peak or surge in the communication bus will not trigger any undesired response in the driving units.

The method may further comprise storing a plurality of data frames in different data buffers.

It is an advantage of embodiments of the present invention that data overwriting is avoided, by writing the sequence of bits of each data frame in a different data buffer, for example in a RAM data buffer of at least 38 bytes.

The method may further comprise addressing every driving unit simultaneously upon interchanging a predetermined sequence or sequences of bits on the first bit sub-string of the ID field.

It is an advantage of embodiments of the present invention that the bus protocol can include one or more valid ID for all driving units, so all driving units acting as slave nodes can be addressed at the same time, allowing simultaneous broadcast to all driving units.

The method may further comprise ignoring one or more predetermined bits of the address for at least one driving unit of the plurality, for addressing more than one driving unit simultaneously.

It is an advantage of embodiments of the present invention that the bus protocol can include one or more valid ID for some LED driving units by applying a mask in the register, for example in the register of the driving unit. The predetermined bit or bits that are ignored are fixed by the mask.

The driving units may comprise an input connection and an output connection for receiving address information and provide status information respectively, wherein the output connection of a driving unit is connected to the input connection of one different driving unit, the input connection of the first driving unit connected to an active voltage information, the output connection of the last driving unit of the plurality not being connected, each driving unit further comprising a direct communication bus to the master control unit, the method comprising setting the maximum value of a counter n equal to the number of driving units further comprising the steps:

checking the status of the input connection of a driving unit, corresponding to the value of counter n, and if the status is active:

providing, by the master control unit, a unique address to a driving unit on its corresponding value of counter n, subsequently sending back the address by the driving unit to the master control unit, verifying the programmed address of the driving unit for the value of counter n, and starting an error handling routine in case there is an error, otherwise:

setting a flag for signaling that the programming is finished for that driving unit on its corresponding value of counter n, subsequently switching the output connection of the driving unit to active state, increasing the value of the counter n by one, repeating the steps until the counter n reaches its maximum value.

It is an advantage of embodiments of the present invention that the bus protocol can include one or more valid ID for some LED driving units by applying a mask in the register, for example in the register of the driving unit. The predetermined bit or bits that are ignored are fixed by the mask.

The method may comprise setting the address of a first slave on a value of 1 for the counter n.

It is an advantage of embodiments of the present invention that the MCU can initialize at any required moment the setting or resetting of addresses to each node. It is a further advantage that an acknowledgment of address establishment is performed by the LED driving units, reducing risks of mislabeling. It is a further advantage that a flexible address setting is provided, independently of the physical position and distance of each LED driving unit with respect to the MCU.

The method may be a method of driving a plurality of driving units for lighting devices.

The method may be a method for driving a plurality of driving units for lighting devices in a lighting application in vehicles.

The present invention also relates to a system comprising a plurality of driving units each for driving at least one electronic unit, a master control unit comprising a single communication bus for establishing interchange of data sequences between the master control unit and each of the plurality of driving units, each driving unit being connected in parallel to the same communication bus, the driving unit comprising a controller, the controller further comprising at least one bus protocol processing unit for processing data interchanged through the communication bus, at least one control unit for controlling the powering of the electronic units according to any data sequence sent by the master control unit, the at least one bus protocol processing unit (33) being adapted for processing an ID field for addressing at least one driving unit, for interchanging data between the master control unit and the at least one addressed driving unit, a data field comprising information and/or instructions regarding the status of the electronic units, wherein the ID field further comprises:

the driving unit address using a first bit sub-string comprising N bits, where $2^N$ is equal or higher than the number of driving units in the plurality of driving units, for applying the data field on the addressed driving unit or ignoring the data field if the driving unit is not addressed a receive/transmit command bit for allowing the master control unit to identify whether data should be received or transmitted, or for allowing each addressed driving unit to decode which action is required by the master control unit depending on the value of the receive/transmit command bit, a further function bit in the ID field for including information regarding the type of instructions included in the data frame, a second bit sub-string for assigning data bits to different electronic units or indicating in the length of the bit string in the data field depending on the value assigned in the further function bit.

The controller may further comprise a timing unit for checking the length of any data sequences received from the master control unit and means for generating an error signal if the interchange of data is performed under a predetermined minimum interval of time or over a predetermined maximum interval of time.

In one embodiment, the RC oscillator just delivers the time base, i.e. the clock. The timing unit may be a timer, which uses the clock as a time base, and measures the times between given events and acts with a signal information, if a predicted timing between the events is not kept.

In one embodiment, the timing unit itself may have a stand alone RC oscillator included.

In one embodiment, the timing unit itself is a stand alone programmable RC oscillator.

It is an advantage of embodiments of the present invention that the controller itself provides a real-time error identification and assessment. It is a further advantage that error assessment is integrated in the controller, reducing chances of interference.

The master control unit may further comprise a common voltage supply line for powering at least one driving unit of the plurality of driving units, the system further comprising at least one protection unit between the at least one driving units and the common voltage supply, for suppressing at least electrostatic discharge on the supply line.

It is an advantage of embodiments of the present invention that the driving units are shielded from electric surges or voltage peaks from the power source.

The single communication bus of the master control unit may be a differential communication bus. It is an advantage of embodiments of the present invention that communication bus is robust against external electromagnetic fields and antenna effects.

The system may further comprise a diagnostics unit for measuring and collecting voltage values from the controller.

It is an advantage of embodiments of the present invention that variations of voltage due to e.g. parasitic resistances of connections can be diagnosed and calibrated.

The diagnostics unit may comprise temperature sensor.

It is an advantage of embodiments of the present invention that variations of data transmission and/or voltage supply at the level of the LED driving units due to temperature changes can be calibrated.

The driver may comprise a processing unit for triggering error handling routines as response to any error result given by the diagnostics unit.

It is an advantage of embodiments of the present invention that error notification can be done directly from the controller, rather than transmitting the signal from the diagnostics unit to the MCU for triggering the error signal.

The timing unit may be an RC oscillator.

It is a further advantage that the implementation can be obtained in a cost efficient way.

The system may be a lighting application in a vehicle.

The electronic units may be LEDs.

The present invention also relates to a bus protocol for interchanging a data frame including a bit sequence, between a master control unit and at least one of a plurality of driving units at slave nodes, the sequence being divided in fields of consecutive bit strings, the sequence comprising an ID field for addressing at least one driving unit, for interchanging data between the master control unit and the at least one addressed driving unit, a data field comprising information and/or instructions regarding the status of the electronic units wherein the ID field further comprises:

the driving unit address using a first bit sub-string comprising N bits, where $2^N$ is equal or higher than the number of driving units in the plurality of driving units, for applying the data field on the addressed driving unit or ignoring the data field if the driving unit is not addressed a receive/transmit command bit for allowing the master control unit to identify whether data should be received or transmitted, or for allowing each addressed driving unit to decode which action is required by the master control unit depending on the value of the receive/transmit command bit, a further function bit in the ID field for including information regarding the type of instructions included in the data frame, a second bit sub-string for assigning data bits to different electronic units or indicating in the length of the bit string in the data field depending on the value assigned in the further function bit.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
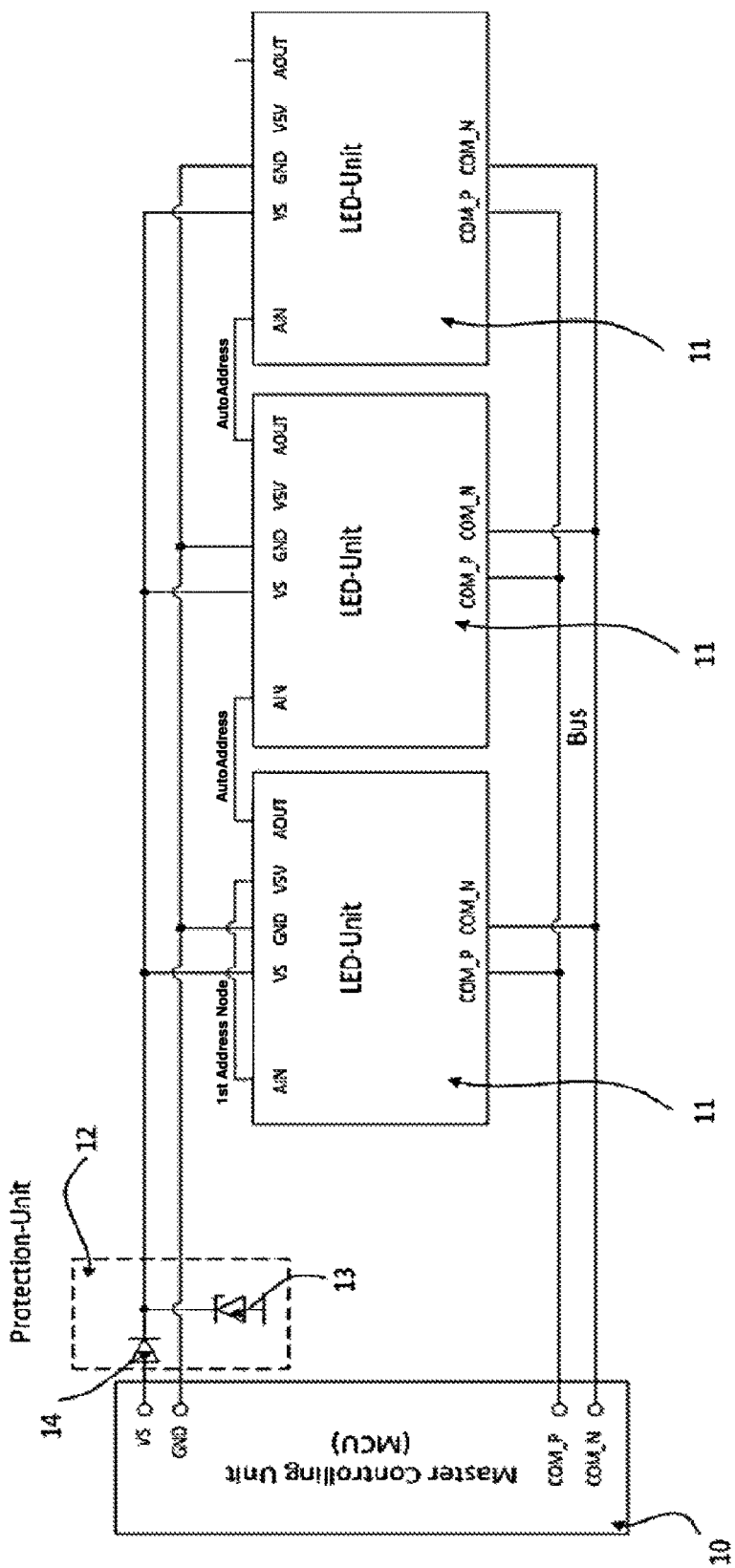
FIG. 1 illustrates a dynamic light system for interchanging data between a plurality of LED units and a master control unit, according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the description, methods and systems are illustrated by referring to LEDs. Nevertheless, embodiments of the present invention apply equally to the driving of other types of electronic devices, such as other types of lighting devices.

Where in embodiments of the present invention reference is made to "PWM", reference is made to pulse-width modulation. However in the frame of the present invention, other pulse modulation techniques can be used for controlling LEDs, such as pulse density modulation, pulse frequency modulation, etc.

Where in embodiments of the present invention reference is made to "slave node", reference is made to those driving units (e.g. LED driving units) connected to a master control unit (MCU). The driving units may comprise one or more electronic device clusters such as LED clusters and a controller for controlling the powering of the electronic device clusters.

In a first aspect, the present invention relates to systems comprising a plurality of driving units each for driving at least one electronic unit, a master control unit comprising a single communication bus for establishing interchange of data sequences between the master control unit and each of the plurality of driving units, each driving unit being connected in parallel to the same communication bus. The system may be a lighting system, for example for vehicles or automotive, but embodiments of the present invention are not limited thereto. The system advantageously provides an increased safety by accurate driving of the electronic units. The driving unit comprises a controller for controlling a plurality of clusters. The controller comprises at least one bus processing unit for processing data interchanged through the communication bus, at least one control unit for controlling the powering of the electronic units of the clusters according to any data sequence sent by the master control unit. The at least one bus processing unit being adapted for processing an ID field for addressing at least one driving unit, for interchanging data between the master control unit and the at least one addressed driving unit, and a data field comprising information and/or instructions regarding the status of the electronic units. The ID field thereby comprises a driving unit address using a first bit sub-string comprising N bits, where $2^N$ is equal or higher than the number of driving units in the plurality of driving units, for applying the data field on the addressed driving unit or ignoring the data field if the driving unit is not addressed, an identification whether data should be received or transmitted, or allowing each addressed driving unit to decode which action is required by the master control unit, using an R/T command bit, an information in the ID field regarding the type of instructions included in the data frame, and data bits assigned to different electronic units or indicating in the length of the bit string in the data field, using a bit sub-string. The system is adapted to have a flexible configurable auto-addressing system for assigning different addresses to the driving units. In some embodiments, the system typically may comprise several registers for providing checkpoints at one or more stages of data interchange, for example at the level of addressing, at the level of powering or information transmission to and from the MCU, or even at the level of starting or finishing data interchange. Typically, the checkpoints are based on comparing the length of a particular string of bits with the expected length of the string at a particular stage of the data transmission. For example, if the communication bus suddenly drops the voltage, but this happens for less than 12 bits of length, the system may disregard this event as noise. If this happens for 12 bits of length, the driving units may start reading the data sequence. This can be applied to several stages of the data transmission, including the end of transmission. This provides very robust shielding against electromagnetic interference, surges, electrostatic discharge and other undesirable phenomena that takes place in automobile environments, resulting in very stable and robust driving of electronic units, such as for example LEDs.

In embodiments of the present invention, a differential bus (e.g. comprising two wires) can be used, rather than a single wire bus. It is an advantage that it allows using low voltages for data transmission, and that use of the relatively expensive Local Interconnect Network (LIN) configurations can be avoided.

The bus can be bidirectional, allowing exchanging light information and diagnostics information.

In some embodiments, up to 60 slave nodes can be addressed, with no need of LIN.

In some embodiments, the data transmission speed may reach high speeds (750 kBaud, 10 ms update cycle). Where reference is made to high speed, reference is made to a speed comparable to the speed obtained with a LIN bus or faster. The speed that is reachable may be in the range of the CAN physical layer up to 2 Mbit. The speed used may depend on the amount of data to be transferred and on the update rate to be reached. The speed targeted at is the minimum rate by which all data that is required can be transferred. These high speeds can be obtained thanks to the parallel layout of the bus. For example, nodes are preferably connected in parallel to the MCU via the bus. Communication may be based on inexpensive and compact oscillators resulting in lower precision requirements as the UART resynchronizes in every byte with the start and the stop bits. An advantage is that a high amount of drivers, e.g. LED drivers, can be implemented as slave nodes in an inexpensive way, because there is no need to implement the invention in CAN or using SPI bus.

The present invention provides functional safety at system level, providing safety functions and diagnostics elements at the bus protocol, and/or at hardware level in the nodes (functional safety level B). The present invention can be robust against voltage drops over the supply lines. The present invention can advantageously present protection means and safety measures in automotive environments, e.g. against electrostatic discharge (ESD), etc., and improve electromagnetic compatibility.

In particular, the present invention can be used in dynamic light systems in automotive environment, e.g. for ambient light as well as signal information for the driver. The system may therefore comprise functional safety requirements. Embodiments of the present invention may comprise safety measures in the bus implementation HW and protocol.

The present invention can provide a dedicated command language, dedicated hardware (HW) memory and register approach for light control. Additionally, open configuration means can be applied to the protocol and HW.

Nodes can be calibrated by autoconfiguration of bus node addresses, and/or by implementing calibration means of each node through the network. Autoconfiguration can be repeated at any time.

Standard and optional features will be further illustrated with reference to FIG. 1, showing an exemplary system based on LEDs. FIG. 1 shows a dynamic light system comprising a master controlling unit (MCU) 10 and several LED driving units 11, which are slave nodes of the MCU and are interconnected between them and to the MCU by a bus. Furthermore, on the supply of the driving units, one or more protection units 12 might be connected. The protection units may protect against surges, or against reverse polarity, etc. In some embodiments, the protection unit or units might comprise a voltage protection element 13, a reverse polarity protection element 14, or a combination thereof. These protection units might suppress high voltage or ESD disturbances on the supply line, and avoid damages on the system in case a reverse polarity of the supply lines VS and GND is applied. The protection unit or units may be connected between the supply and at least one LED driving unit, or some of the units from the plurality. For example, it may be connected between the supply and all the LED driving units, as shown in FIG. 1.

The light information, e.g. light intensity, light color or PWM ratios related thereto, may be transported from the master controlling unit 10 to the LED units 11 via a bus. The present invention is not limited to light information, and diagnostics information may be interchanged also between the LED units and the MCU, also via the bus. Diagnostics information may include information whether all LEDs carry a given current or not. Further, the bus may support also an address assigning method from the MCU to all slave nodes. In such cases, communication in the bus is bidirectional.

The system may comprise a high number of LED driving units as slave nodes of the MCU, e.g. 60 slave nodes. The system allows high speed of information transmission, e.g. allowing 750 kBaud for transmitting pulses (in the form of bits) for driving the LEDs, with for example 10 ms update cycle for all LEDs, updating the information regarding illumination in a very fast and smooth way. Systems based on a LIN bus or solutions based on shift registers interconnected between the slave nodes, as known in the art, are too slow. Moreover, systems based on LIN bus would only enable 16 slave nodes.

The communication bus may be of any kind, however a differential bus with 2 wires (e.g. COM_P, COM_N) is a preferred implementation. Such buses can provide the required communication speeds, as well as communication with a high number of slave nodes, particularly in automotive applications including embodiments of the present invention.

FIG. 2 shows a LED driving unit 11 suitable for an illumination system of the first aspect of the present invention. It comprises a LED controller 20 and one or more LEDs 37 distributed in one or more clusters 38. A cluster may be, for example, a RGB unit comprising a red, a green and a blue LED connected to three pins of a LED controller 20. The LED driving unit further comprises connections to ground (GND) and to the supply (VS), as well as typically AIN and AOUT connections, for allowing node addressing (autoadressing, as explained below). Further, connections (COM_P, COM_N) to the differential bus are included in the LED driving unit and controller. In embodiments of the present invention, communication with the MCU may be based a clock derived from the data transferred. For example, the controller 20 may comprise an oscillator 41.

The communication interface of the MCU 10 (not shown in the drawings) together with the communication interfaces 32, 33, 34 of the controllers 20 of the respective LED units acting as slave nodes, may form a differential, bidirectional bus. Light information, calibration data, diagnostics information and other types of data can be transported over this bus.

The LED unit controller 20 may be included in an integrated circuit (IC). A compact controller can be advantageously provided. It might comprise for instance one or more switch element controls 21. These can be used to provide, via the one or more switch elements 40, supply voltages to one or more external consumers. The switch elements 40 may be for example transistors. The switch element controls are controlled e.g. by a microcontroller 27.

The controller 20 may further include controls 22 of current source, switch elements and pulse width modulation (PWM). One control 22 can be provided per cluster, or a single control 22 can be provided for controlling more than one cluster, via e.g. multiplexing as shown in FIG. 2b. The microcontroller 27 can provide information regarding frequency and duty cycle to the included PWM registers. The frequency and duty cycle can be different in all PWM registers, and it can also be a static on/off. In other words, the driver can also be driven to a constant on or constant off value. A current source 39 and a switch element 40 can be connected to each PWM register, which may comprise the provided PWM or static on/off. The microcontroller further provides information and instructions for the one or more different current sources. The information may comprise for example the DC current values that the connected current sources will apply. Each current source can carry a different DC current. Each current source further can be modulated with a PWM, e.g. provided via the connected PWM register. Each switch element 40 and current source 39 can be interconnected, and connected to a light emitting diode LED 37 of a cluster 38. Therefore, both the switch element 40 and current source 39 can both drive the LED 37. Because each LED can be controlled individually via the switch element and the current source, and both can be modulated with a PWM or can be driven in static way under use of a DC current, each LED can carry an individual light intensity, which can reach a light output ranging 0% to 100% per LED. The combination of switch elements together with current sources allows an optimal control of the LEDs under the aspect of the power dissipation in the LED unit controller.

However, the present invention is not limited thereto. A driver may alternatively or additionally comprise only current sources 39 connected to one or more current source- and PWM-controls 23. The microcontroller 27 may provide frequency and duty cycle information to the included PWM registers. The frequency and duty cycle can be different in all PWM registers, it can also be a static on/off, and each PWM register controls a current source 39 that can carry the provided PWM (or a static on/off). The microcontroller further provides different current source information and instructions, as already explained. Each current source can carry a different DC current, and be modulated with a PWM provided via the connected PWM register. Because the LED is controlled individually via a current source, in turn controlled by a PWM or in static way under use of a DC current, each LED can carry an individual light intensity, that can also reach from 0% . . . 100% light output per LED.

This implementation allows a linear control of the LEDs under the use of adjustable DC currents in the current sources (or a static supply) provided by the switching elements. It also allows PWM driving, or a combination of both.

Type of switches are advantageously e.g. transistors, current sources are advantageously transistors as well, which are controlled in a current delivering mode. Transistors and current sources can be ground or supply related.

The controller 20 of the LED unit 11 further comprises a voltage regulator 26, for regulating the external supply voltage (e.g. a car battery supply voltage VS) and adapting it to the voltage needed by the LED driving unit. For example, the voltage regulator can regulate the supply voltage VS down to lower voltages, needed in the integrated controller. The driver may comprise at least one oscillator 41, for example connected to the regulator. The oscillator may be an oscillator with adjustable frequency, and may provide a system clock to all elements of the controller 20 which may need a time base, e.g. the microcontroller 27, control units 22 for switch elements, current source and PWM, control units 23 for current source and PWM, timers (not shown), etc. The oscillator 41 may be an RC-oscillator 41. These are compact and inexpensive (at least less expensive than the crystal oscillators typically used in CAN implementations), which advantageously reduces the cost of the controller, and a high number of slave nodes can be therefore connected to the MCU at low cost.

A microcontroller 27 may comprise a central processing unit (CPU) 28 that performs calculations and receives and/or provides information via an address- or data bus to the connected units of the controller. The CPU may be adapted to receive interrupt instructions, which might have an immediate or a future influence on the processes handled by the CPU. The microcontroller can further comprise data storage 29 which can be used during processing, for example for data processing of PWM ratios for the different PWM registers, calculated immediately as response of light intensity requests (calculated "on the fly") which may be, and usually are, provided by the MCU 10. The data storage 29 may be a random-access memory (RAM), which may comprise several data buffers.

The microcontroller may further comprise a data memory 30, and/or a program memory 31. The nature of these memories is, that they do not lose the data, when the supply is going down. For example, these memories may be non-volatile (NV) memories. Program memory 31 may be an NV memory in which the instructions for the CPU can be stored. Such a memory can be for instance a read only memory (ROM) or a flash memory. The microcontroller 27 may further comprise a data memory 30, e.g. an EEPROM, which may contain data such as e.g. calibration data, address information, status information, etc.

In some embodiments of the present invention wherein the LED controller is an integrated circuit, the PWM control and ADC measurements can be synchronized between each other, so that measurements errors because of PWM switching can be eliminated. However, a diagnostics unit 35 can be included, for example for measuring and collecting voltages from one or more pins of the LED unit controller. This unit 35 may comprise an analog to digital converter (ADC). It further can also measure e.g. currents running through the connected LEDs. The diagnostics unit 35 may further contain a temperature sensor for providing temperature measurements of the integrated circuit. The diagnostics unit 35 can be read at any time by the CPU. The CPU might provide a check on the measurement results and might compare them with predicted values (thresholds), that are e.g. in the NV data memory or that are provided via the MCU. If the measurements are above or below given thresholds, that CPU can trigger for instance error handling routines or might start a regulation process, so that the system is brought back to a normal operation conditions. If the temperature of the integrated circuit is e.g. too high (for example, high enough to start affecting the resistance of the buses and connections), the CPU could start to switch into a current saving mode or could start to dim the connected LEDs down. All security measures of the specific slave node might be communicated towards the MCU, which may in turn trigger other LED driving units for other measures, so that the overall system performance might be lowered for protecting the system.

Figure 3:
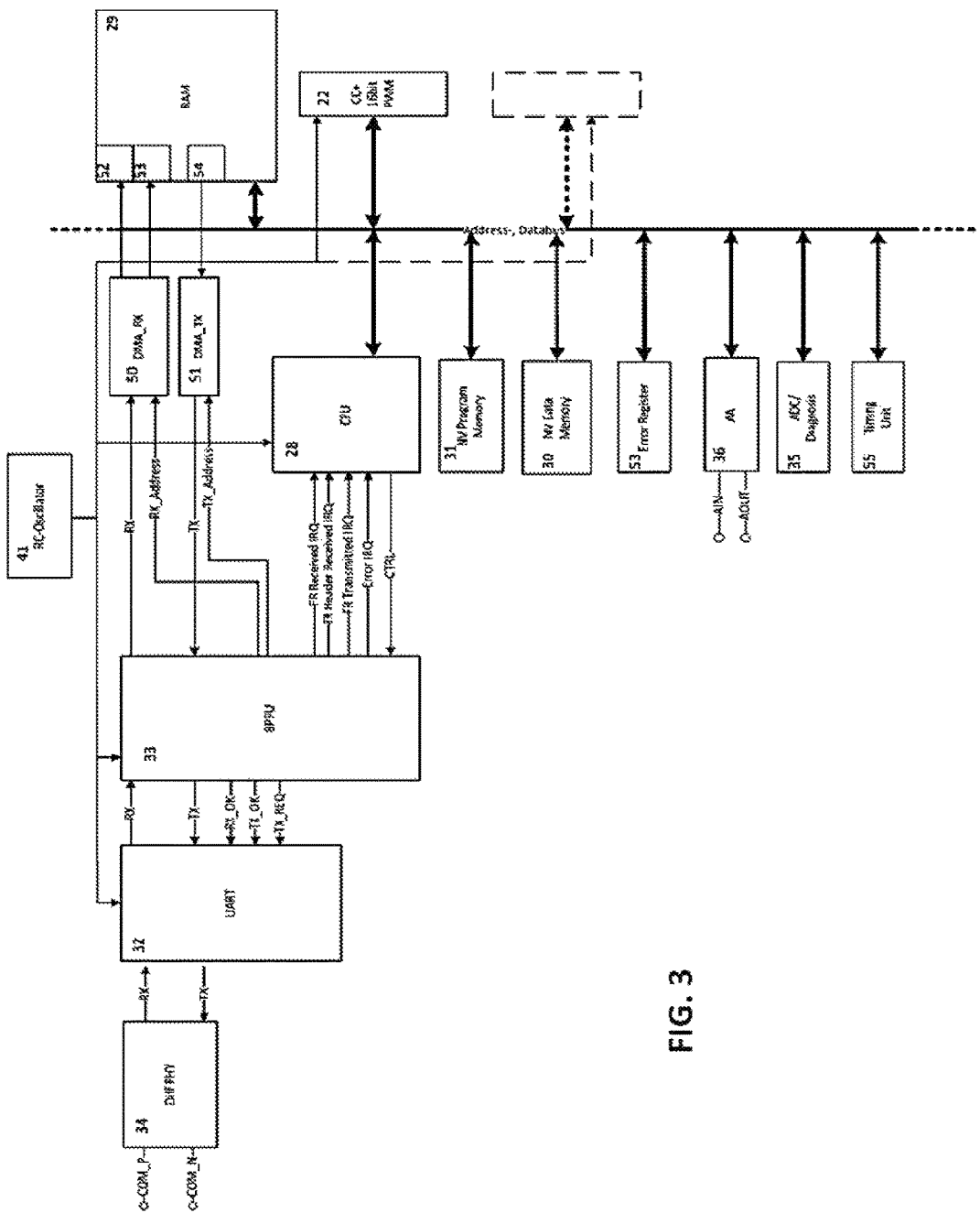
FIG. 3 illustrates a subsystem of a controller indicating the path of interchanged data within the controller, according to embodiments of the invention

The signals are transmitted through a communication bus, as already explained. FIG. 3 shows a possible implementation of the signal route in the controller. In embodiments of the present invention including a differential communication bus, the controller 20 may comprise a differential physical layer 34 connected to the differential bus signals COM_P, COM_N, for transforming these external bus signals into internal receive (RX) and/or transmit (TX) signals used by the LED unit controller. The differential physical layer protects the integrated circuit against ESD and EMC influences from the automotive harness and takes measures for the overall EMC compliance. The data is interchanged between the physical layer 34 and a universal asynchronous receiver transmitter UART 32.

A bus protocol processing unit (BPPU) 33 performs the processing of the data to be received/transmitted, applies functional safety measures, and/or triggers error handling if needed. The BPPU may also generate interrupts and control signals and send them to the CPU and to the UART 32. The overall implementation reduces the need of resources of the CPU. The BPPU 33 may comprise e.g. a digital state machine, or any other type of unit for processing the bus protocol for dynamic light applications.

A timer or timing unit 55 may be used to check the length of the data sequences. If the length of a sequence, or part thereof, does not correspond with the expected values, an error signal can be generated.

At least one direct memory access controller (DMA) 50, 51 can be included, for providing direct access to one or more data buffers 52, 53, 54 of the data storage 29. This gives the advantage of minimizing the load of the CPU regarding communication needs to and from the MCU, because the UART can put in receive mode the received data, via a data processing in the BPPU via a direct memory access control for receive (DMA_RX) directly to a first receive data storage buffer 52 or to a second receive data storage buffer 53. The BPPU selects, by the address information provided e.g. by RX_Address, which data storage buffer is used.

In one embodiment data frames can also be stored for instance in an alternating way in the data storage buffers, e.g. each 1st data frame is stored for instance in the first receive data storage buffer 52, each second data frame is stored for instance in a second receive data storage buffer 53. This avoids an overwriting of data with each new incoming data frame.

Receive modes and transmit modes, depending on the bus protocol, can be triggered for instance by the BPPU to the CPU and the UART. In transmit mode the CPU might put data to a transmit data storage buffer 54 via the common address and data bus. The BPPU might take this data from a transmit data storage buffer 54 under use of a direct memory access control for transmit (DMA_TX) 51 the under use of the address information provided e.g. by TX_Address and transfer the data to the. UART and BPPU might process the data further.

The data storage buffers have e.g. a size of 38 Bytes, or 40 Bytes in order to handle the bus protocol in an optimal way. Several data storages and buffers can be included. For example, an error register can be included as a data buffer of the data storage 29.

Further, a timing unit can be included for checking the length of data sequences interchanged with the MCU or within different units of the controller. Further, an auto-addressing control and connections can be included, e.g. including comparators 70, units for setting an adjustable reference voltage 71, debouncing units 72, different registers 73, 74, as well as pins for input and output which may be connected to other LED driving units.

The connections of the LED clusters to the pins of the controller in a LED unit 11 can be adapted in any suitable way. In one embodiment, the controller 20 can e.g. drive 4 RGB units 38 as demonstrated in FIG. 2A. In this embodiment, each LED cluster 38 is connected to the supply VS and at least to the current sources of the controller 20. In another embodiment, the controller 20 can e.g. drive 6 RGB units as demonstrated for instance in FIG. 2B. In this particular embodiment, the LED clusters are connected to different pins of the controller, none of which is connected to the supply. Some clusters may have their LED anodes connected to a switch and a current source, or only to a switch, while their cathodes can be connected to current sources.

In a further aspect, the present invention also relates to a method of operating a plurality of driving units for powering electronic units. The method comprises interchanging a data frame including a bit sequence, between a master control unit (MCU) and at least one of a plurality of driving units at slave nodes, the sequence being divided in fields of consecutive bit strings.

The method comprises applying an ID field for addressing at least one driving unit, for interchanging data between the master control unit and the at least one addressed driving unit and applying a data field comprising information and/or instructions regarding the status of the electronic units. Applying the ID field thereby comprises indicating the driving unit address using a first bit sub-string comprising N bits, where $2^N$ is equal or higher than the number of driving units in the plurality of driving units, for applying the data field on the addressed driving unit or ignoring the data field if the driving unit is not addressed, allowing the master control unit to identify whether data should be received or transmitted, or allowing each addressed driving unit to decode which action is required by the master control unit, using an R/T command bit, performing a length decoding step, for including information in the ID field regarding the type of instructions included in the data frame, using an F function bit, and assigning data bits to different electronic units or indicating in the length of the bit string in the data field, using a second bit sub-string. In another aspect the present invention also relates to a corresponding bus protocol.

Further standard and optional features of the method for operating driving units and of the bus protocol will be illustrated by way of particular examples as described below. In the following, exemplary bus protocols and addressing methods thus will be described. By way of comparison, the state of the art protocol UART is shown in the upper drawing 700 of FIG. 7. According to exemplary embodiments of the present invention, a bus protocol for a dynamic light system is provided, for data interchange between the MCU and the plurality of LED driving units acting as slave nodes. The disclosed bus protocol for a dynamic light system is not be compliant to standard bus protocols, such as the UART protocol, in general. The proposed bus protocol includes a data frame comprising a sequence of consecutive bits grouped in strings, or fields. The data frame includes an ID field and a data field. In an exemplary embodiment shown in the second drawing 710 of FIG. 7, the bus protocol for a dynamic light system comprises a BREAK field, for example being active low (low voltage, as opposed to the high voltage when the bus is inactive). The BREAK field may comprise any number of bits, for example one, or for example 12 bits being e.g. active low at the beginning of a data frame. The length of 12 bit times has the advantage that this length is longer than a complete data frame of a UART (which is 10 bits in total, see upper drawing 700 of FIG. 7).

This leaves enough headroom in the automotive environment in order to recognize with the BREAK field a start of a data frame.

The bus protocol for dynamic light applications may further comprise a data field of variable data length, following the ID field as previously described. The nature of the bytes can be of any type.

For example, in one embodiment, it can comprise e.g. light information. The light information can be direct information for the PWM registers which control the LEDs in the RGB units. It can also be just light intensity or light color information for an RGB unit. In this case, the CPU of the LED unit controller may calculate the PWM settings for the PWM registers using this provided information.

In another embodiment, the data can also be just information to the switch elements 40, for example to provide a supply to consumers.

In another embodiment, the data field may comprise a diagnostics information of the slave node to the MCU. It can be, for instance, a temperature information of the light unit controller.

In another embodiment, the data can be e.g. a broadcasting command for all slave nodes. For example, it may be a command to instruct that all slave nodes should switch all their LEDs off. Other commands might be defined, also in one or more combinations, in one or more embodiments, as for instance:

enter e.g. an application mode,
enter e.g. a calibration mode, e.g. to pre-set defined light outputs to all LEDs,
enter e.g. autoaddressing mode as further described,
enter a programming mode for e.g. the NV program memory (31),
send e.g. color information to LEDs and/or LED units,
enable e.g. a driving mode for the LEDs (e.g. a linear driving or PWM driving),
request e.g. a diagnosis, if e.g. all LEDs carry a current,
request e.g. a slave address,
request e.g. a color information for the LEDs RGB units,
request e.g. a temperature information,
write e.g. data to a given memory location,
read e.g. data from a given memory location,
enter e.g. to a stand by operation e.g. a sleep mode, etc.
Several other commands might be implemented as well. The data field is flexible nature.

In some embodiments, the bus protocol for dynamic light applications may optionally comprise a cyclic redundancy check (CRC) field, for example of 16 bit, following the data field. The CRC generation and CRC checks can be done over the ID field and the data field. The CRC calculation follows state of the art CRC calculations and will not described further.

At the end of the data frame, e.g. after the CRC field, an End of Frame might follow. The End of Frame might be in one embodiment just a stop bit, similarly to the UART transmission, being actively high, according to FIG. 7 part 700. The End of Frame may present other lengths. For example, it can also present much longer bit times, as for instance of 12 bit times.

Figure 7:
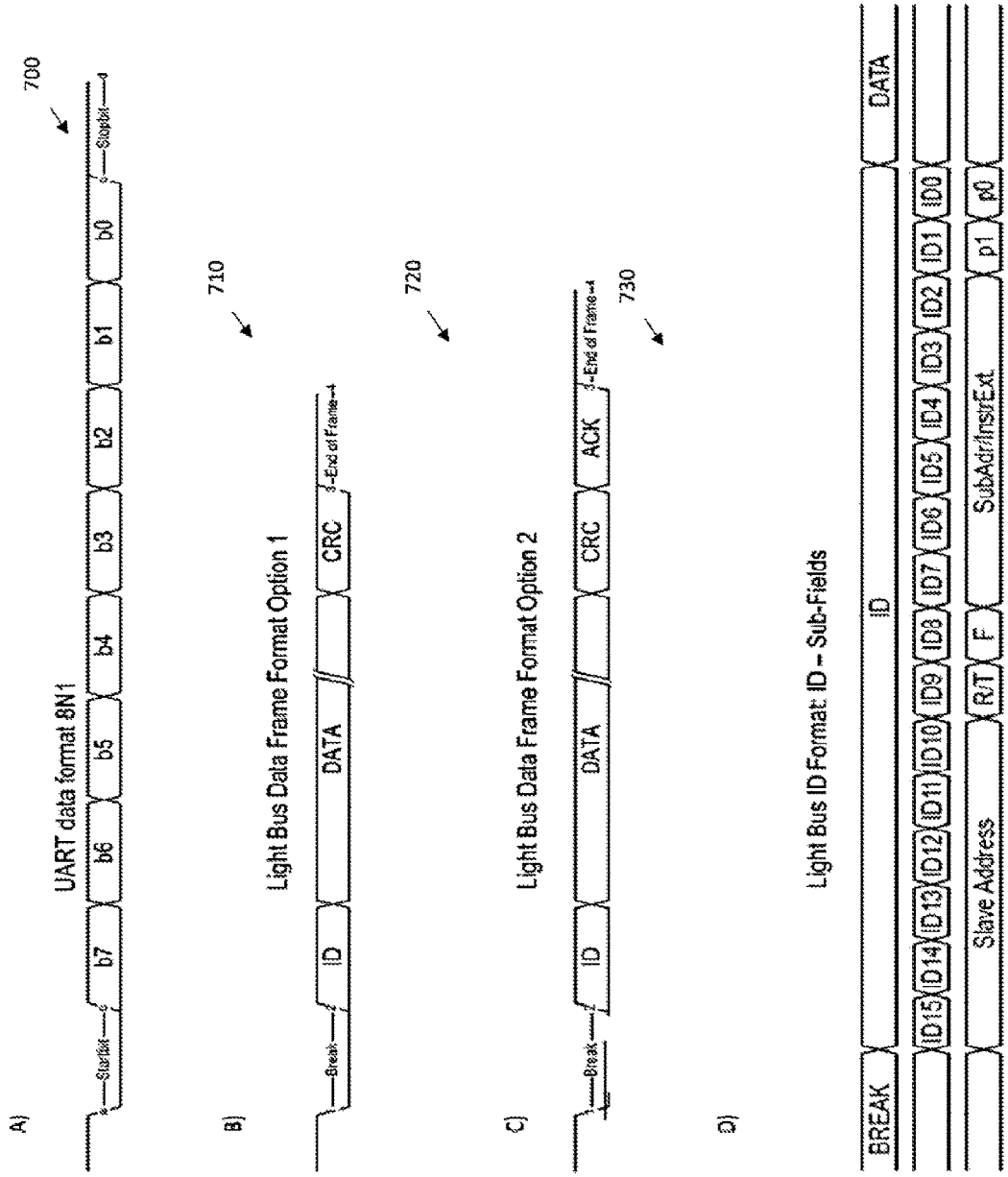
FIG. 7 shows different data formats for data frames, the upper data format according to a UART data format of the prior art, the second and third a light bus data frame according to embodiments of the present invention, and the fourth data frame showing the sequence of bits of an ID field in detail, according to embodiments of the present invention.

In a further embodiment showed in the third drawing 720 of FIG. 7, the CRC field might be followed by an Acknowledgement (ACK) field, followed by End of Frame field as previously described. The ACK field acts only on received data frames, and it is carried out by the slave node. The ACK field might comprise of 1 byte to be sent by a slave node immediately after the CRC field. The slave might send a predefined byte, if a reception of data was OK and no error occurred. The byte might be for instance predefined with 01111110. Because the acknowledge information is known by the MCU (e.g. it can be programmed therein), a received information different than this might lead to the identification of a disturbed communication channel, which allows the MCU to diagnose this error and to take further measures in error handling.

In one embodiment, the ACK field might be 00000000, if the reception of data was not complete and correct. In another embodiment, an ACK might not be send, if the reception of data was not complete or incorrect.

In all these cases, the MCU is able to diagnose if there was an error during the reception of data.

In one embodiment of the invention, a next data frame, starting with the BREAK field, can follow immediately after the stop bit of the UART transmission.

In the next paragraphs, an exemplary ID field will be discussed, which in embodiments of the present invention comprises security protocols and checks. In embodiments of the present invention, the ID field comprises a sequential plurality of bits, following e.g. a BREAK field. At least one bit of the ID field is assigned to addressing the LED driving units acting as slave nodes. Preferably, a first sub-string of bits are assigned to slave node addresses. Further, the ID field includes at least one further bit, which is a command bit which includes information whether the data frame includes a data field for transmission or for reception. Further, the ID field includes a function bit representative of the function of the data frame, and at least a further bit, preferable a plurality of bits, for assigning a value corresponding to the specific function of the data frame. For example, the plurality of bits may be assigned to specific addresses of individual LEDs in the LED driving unit, when the data frame comprises instructions from the MCU to power up the illumination systems. For example, the plurality of bits may comprise a value representative of the number of bits present the subsequent data field.

The fourth drawing 730 of FIG. 7 shows an exemplary embodiment of an ID field according to embodiments of the present invention. For example, the bus protocol for dynamic light applications further comprises a 16 bit ID field, subsequent to the BREAK field.

The 6 highest bits of the ID field (ID15, ID14, ID13, ID12, ID11, ID10) may indicate the slave address. This would allow to address 64 slaves. In some embodiments, some addresses may be fixed. For example, in the definition of the light bus protocol, e.g. the 4 lowest addresses 000000, 000001, 000010, 000011 (or the 4 highest addresses 111111, 111110, 111101, 111100, or any other predetermined address or set of addresses) can be considered to be a valid ID for all slave nodes. This particular embodiment has the advantage that the MCU can address all slave nodes in a broadcasting way, simultaneously. In other words, all the slave nodes (all LED driving units) will interpret these ID as a valid ID. This leaves for instance room to an application in which each individual slave node might receive a light setting information and just memorizes this setting. With a broadcasting command, all slave nodes might apply at one and the same time this light setting so that the overall system shows a homogeneous change of the light setting. In the particular embodiment with 6 bits for ID field and using four addresses for broadcasting, the chosen implementation would allow to address 60 slave nodes.

Further, ID9 of the ID field contains a receive (R) or transmit (T) command bit. For example, ID9=0 equals for receive, so the data frame includes a data field sent from the MCU to the driver, and e.g. ID9=1 equals for transmit, so the data frame is a data frame sent from the driver to the MCU. This allows the master to control each slave in a separate way, if data should be received or data should be transmitted. It further allows the slave node to decode which action is requested by the master controlling unit. The values assigned to ID9 may be different.

A subsequent bit ID8 of the ID field may comprise a further function information F.

If e.g. ID8=1, the received data in receive mode will have a length defined by the number of bits in the SubAddress ID7, ID6, ID5, ID4, ID3, ID2 multiplied by 6 bytes. This leaves room for a variable data length between 0 byte (no bit set: ID[7:2]=000000) and 36 bytes (all bits set: ID[7:2]=111111).

The LED clusters of a LED driving unit may be numbered, so they can be addressed. For example, the RGB units 38 of a LED unit 11 (as shown for instance in FIG. 2B) might be numbered e.g. as RGB unit 0, RGB unit 1, RGB unit 2, RGB unit 3, RGB unit 4, RGB unit 5, in a random order or in an order chosen by the MCU.

Further, the bit positions of the SubAddress [7:2] might be assigned to the numbered RGB units. This may lead for example to the following assignments:

ID7—RGB unit 5, if ID7=1, 6 data bytes are assigned, if ID7=0, 0 data bytes are assigned to RGB unit 5
ID6—RGB unit 4, if ID6=1, 6 data bytes are assigned, if ID6=0, 0 data bytes are assigned to RGB unit 4
ID5—RGB unit 3, if ID5=1, 6 data bytes are assigned, if ID5=0, 0 data bytes are assigned to RGB unit 3
ID4—RGB unit 2, if ID4=1, 6 data bytes are assigned, if ID4=0, 0 data bytes are assigned to RGB unit 2
ID3—RGB unit 1, if ID3=1, 6 data bytes are assigned, if ID3=0, 0 data bytes are assigned to RGB unit 1
ID2—RGB unit 0, if ID2=1, 6 data bytes are assigned, if ID2=0, 0 data bytes are assigned to RGB unit 0

It can be seen (FIG. 2A, 2B) that each RGB unit 38 may include for instance 3 individual LEDs 37. One PWM register included in the control 22 for the switch element, current source and PWM can be 16 bits (2 bytes) wide, for example. Each LED is controlled by a PWM register. Thus, 2 bytes multiplied by 3 LEDs per RGB unit equals 6 bytes. Thus 6 bytes would be needed for a light information setting for one RGB unit. Clearly, the chosen implementation allows to transmit a complete light information setting for a LED unit such as the one shown in FIG. 2B.

If on the other hand ID8=0, some bits of the ID field may be used instead to include information regarding the upcoming data field. For example, the bits of the ID field, e.g. ID4, ID3, ID2, are decoded as number of bytes of the data field that follows the ID field. For instance, the following bit settings could be possible:

000, thus no bit set, indicates a data length of 0 byte
001, 010, 100, thus 1 bit set, indicates a data length of 6 byte
011, 101, 110, thus 2 bits set, indicates a data length of 12 byte
111, thus 3 bits set, indicates a data length of 18 byte.

These settings can be inline also with the settings chosen with ID8=1 as previously described. This advantageously simplifies the hardware for decoding the data length, providing a cost efficient and flexible implementation.

The ID field may further comprise a double parity check using the last two bits. For example, ID1 and ID0 may contain a parity information p1 and p0. The definition of the parity can for instance be as follows:

p1: even parity bits over ID[15:2], (with e.g. p1=1, if the number of bits on ID[15:2] set to 1 is an even number)

p0: even parity over bits ID[7:2], (with e.g. p0=1, if the number of bits on ID[7:2] set to 1 is an even number)

This implementation gives security on bits ID[15:8] and especially on the slave address in bits ID15 to ID10, and especially higher security with a double parity to the length information in ID7 to ID2. The data length is extra-secured to prevent a potential sending of an error code in the ACK field and by that disturb the bus traffic.

The order of the bits of the exemplary embodiments are not limiting, and other order may be applied. For example, the described bit orders can also be changed during a transmission. For example, in the exemplary UART transmission of the first drawing 700, which starts with bit 7 and finishes with bit 0, it can also be start with bit 0 and finish with bit 7. Analogously, the ID field, data field, or any other field of the present invention may comprise different bit order. The assigned functionality of the bits may however not change.

Figure 2A:
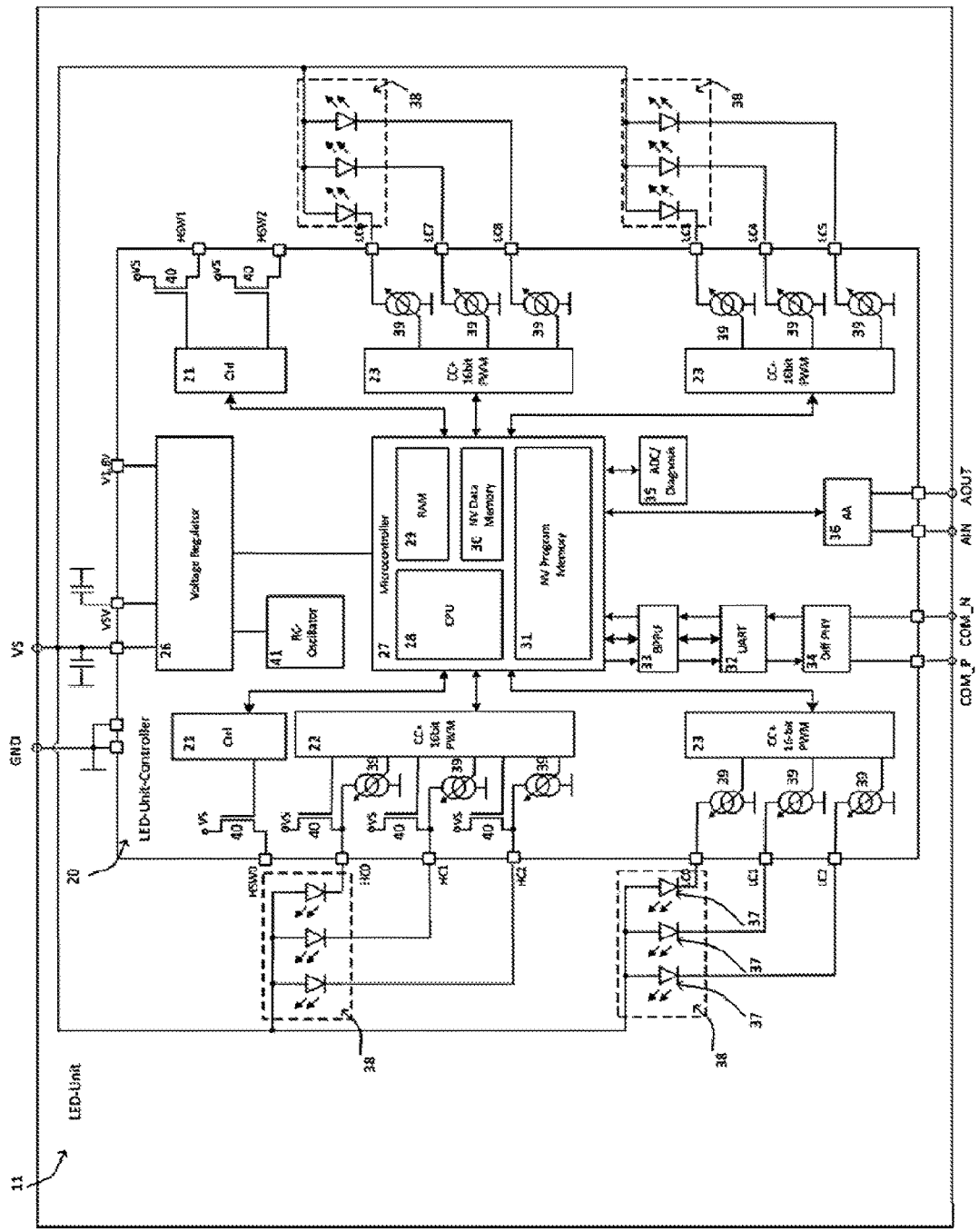
FIG. 2A and FIG. 2B illustrate two possible LED driving units according to embodiments of the present invention.
Figure 2B:
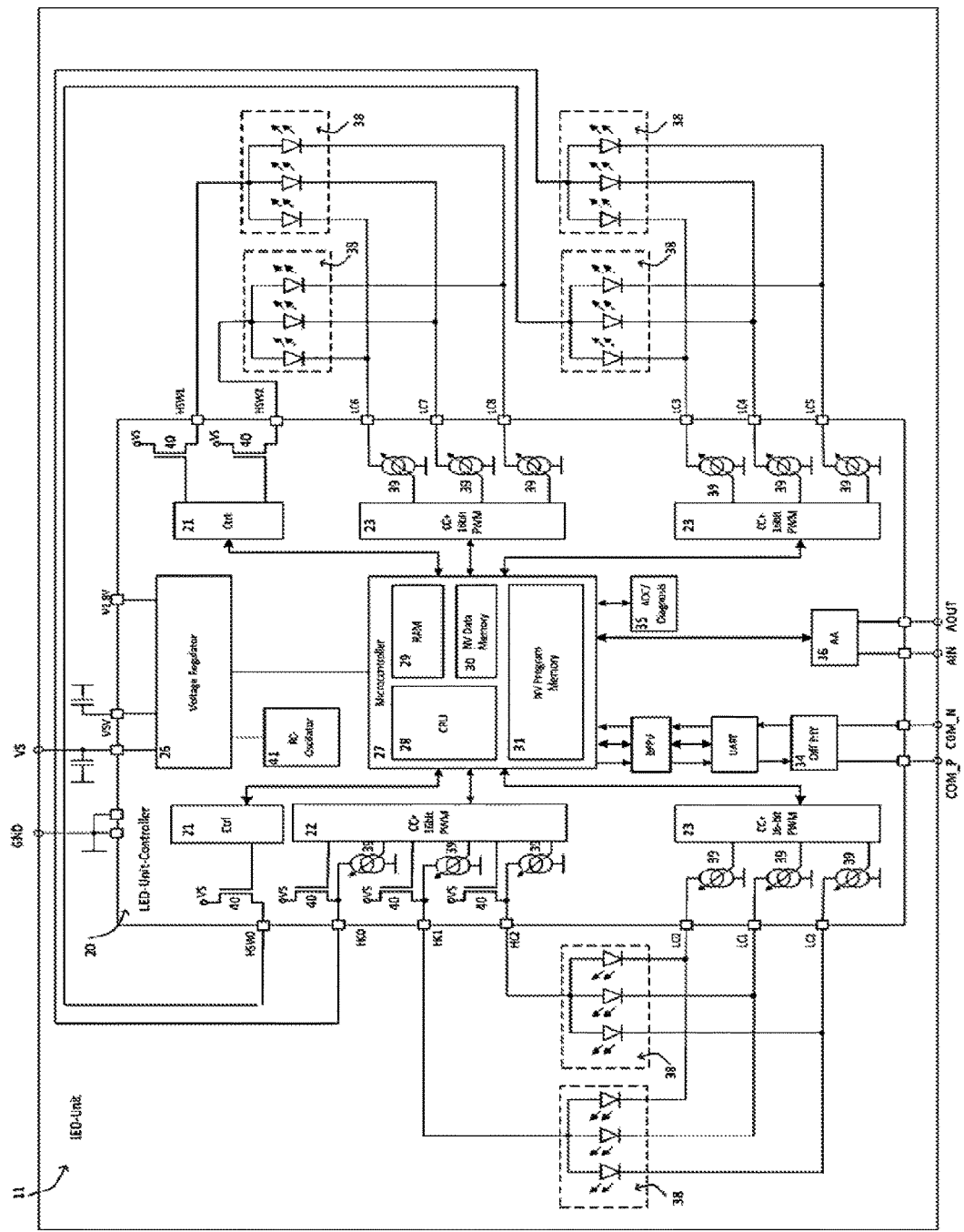
Figure 5:
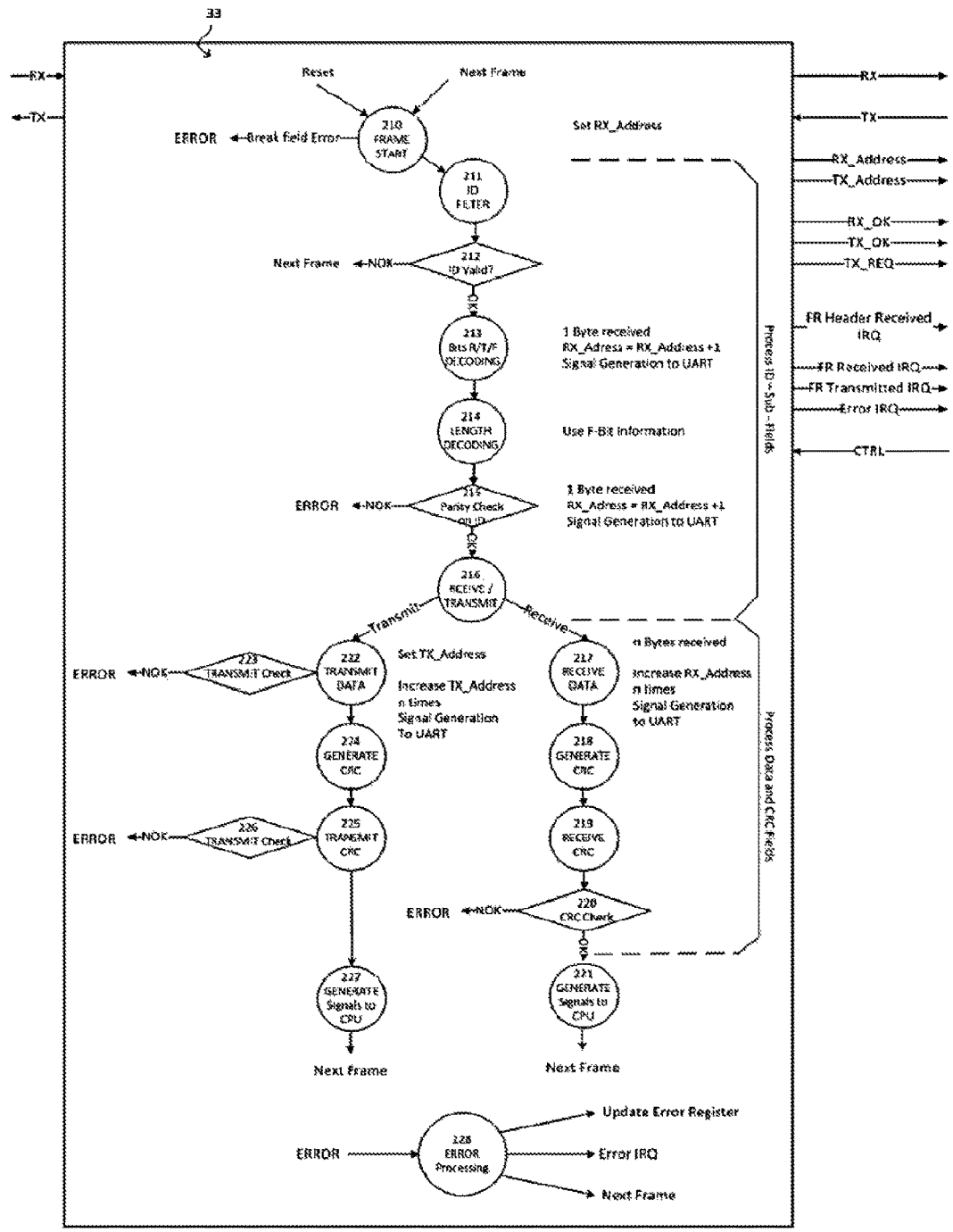
FIG. 5 illustrates a flowchart of possible actions taken by a bus protocol processing unit, according to one embodiment of the invention

FIG. 5 shows a flowchart of the method of data route in the LED driving unit of FIG. 2A, 2B and FIG. 3. Some or all of these steps may be carried out in the BPPU 33. In a first step, the BPPU may for example detect, on a receive signal (RX) (e.g. received from the MCU through the physical layer and the UART), a BREAK field. This would start 210 a data frame processing at frame start. A timer 55 might check, for instance, if the BREAK field is too long or to short and might generate a break field error in such cases. The break field error is then processed in an error routine 228. If no error is detected, a receive address RX_Address is defined, which is handed over to DMA_RX 50, so that data can be stored in the one of the receive data storage buffers 52, 53.

As described previously, a data frame may start with an ID field ID[15:0] (drawing 730, FIG. 7), specifically with a slave address ID[15:10]. The slave address is processed 211 further in the ID filter.

The ID filter can be configured e.g. via a control signal CTRL from the CPU to the BBPU, to contain for instance a valid address of the slave node. Alternatively or additionally, it can also further be configured that the LED driving unit can react on more than one address. This can be done by a mask manipulation. In one realization, the mask information might be in a register IDMASK[5:0] (not shown in the drawings). The valid and predefined address of a slave node might be in another register ADDRESS[5:0] (not shown in the drawings). The incoming ID slave address information ID[15:10] is compared with a comparator to the ADDRESS [5:0] information, in dependency of the IDMASK[5:0] information. In one embodiment, a certain bit of ID[15:0] is not compared, if the corresponding bit in IDMASK[5:0] is active high. This leads for instance to the following examples:

IDMASK[5:0] 0 0 0 0 0 0
ADDRESS[5:0] 0 0 1 0 0 1
ID[15:10] 0 1 1 1 1 0

In this given example, the slave node is not addressed, because all bits are compared and the received ID address does not match with the predefined slave address.

IDMASK[5:0] 0 0 0 0 0 0
ADDRESS[5:0] 0 0 1 0 0 1
ID[15:10] 0 0 1 0 0 1

In this given example, the slave node is addressed, because all bits are compared and the received ID address matches with the predefined slave address.

IDMASK[5:0] 0 0 0 0 0 1
ADDRESS[5:0] 0 0 1 0 0 1
ID[15:10] 0 0 1 0 0 0

In this given example, the slave node is also addressed, because bit 0 of ID[15:10] (ID10=0) is not compared (the IDMASK has a 1 in the corresponding position) and the received ID address matches with the predefined slave address in the remaining bits ID[15:11].

This implementation allows to address more than 1 slave node at one and the same time. Similar as broadcasting comments as previously explained, the slave nodes, that are addressed together, might take a given light setting being operative at one and the same time, which allows e.g. smooth light sceneries. In embodiments, the masking does not act on addresses defined as addresses to be valid for all slave node during broadcasting, as previously described.

Then, the validity of the ID address is checked 212. If the slave node is not addressed, the slave node might ignore the further data stream of the current data frame. The BPPU of this specific slave node might wait for the next data frame.

If, on the other hand, the slave node has identified a valid ID, bits ID9 (R, T) and ID8 (F) are decoded 213. In the present embodiment, at this point a byte has been received, which can be transferred to a receive data storage buffer via DMA_RX 50. The RX_Address is increased accordingly, so that a next byte can be received and stored in the receive data storage buffer. With this step, also interface signals to the UART are generated. These interface signals may include information that the reception was correct (RX_OK) and that a next byte can be received.

The decoded bits R/T/F can be handled according to the method previously described.

Depending the value of bit F and ID[7:2], a length decoding step 214 can be performed. At this step it will be known, how many bytes of the data frame will follow as data field.

Next, the parity of the ID field can be checked 215 in order to detect any error on the ID. As previously described, the used method can be a double parity check, what adds a higher security level, e.g. on ID[7:2] as shown previously. An error can be processed further in an error routine 228. In the present embodiment, at this step, a 2nd byte is received and stored to a receive data storage buffer, so that also RX_Address is increased again, and signals to the UART, e.g. RX_OK, are generated accordingly.

Depending on the bit ID9 (T, F) a step receive or transmit is initiated 216. At this state, also an interrupt signal (e.g. FR Header Received IRQ) towards the CPU might be generated. Depending on the state of ID9, the CPU may be triggered for a transmission or a reception of data. In the following, the process of reception of data will be described (ID9=0), and then the process of transmission of data (ID9=1) will be described.

If e.g. ID9=0, a further step for receiving data will be performed 217, and n bytes according to the available length of the data field will be received. The length is always encoded in the ID field. It is secured by the 2 parity bits and by the CRC. After each received byte, the byte is stored in one of the receive data storage buffers, the RX_Address is increased and the signals to the UART are generated accordingly.

Over the whole data stream (ID field and data field) a CRC of 16 bits (2 bytes) is generated 218 by the BPPU, under use of state of the art methods.

A CRC as part of the data frame can be subsequently received 219. Because the CRC comprises 2 bytes, after each received byte, the byte can also be stored in one of the receive data storage buffers, the RX_Address is increased and the signals to the UART are generated.

The exemplary embodiments present 2 bytes ID field, a maximum of 36 bytes data field, and 2 bytes CRC field. Thus, the receive data storage buffer size for each receive data storage buffer (52, 53) would be 40 bytes. If the received CRC is not stored in the receive data storage buffer, the buffer size may be 38 bytes. These values are not limiting, and other values of fields can be used.

Then a CRC check can be performed 220 on the received CRC and on the previously generated CRC. If the result does not match, the error might be processed in an error routine 228.

With the end of the data frame, the BPPU might generate 221 signals to the CPU. These signals may comprise for instance an FR Received IRQ interrupt, informing the CPU that a data frame in one of the data storage buffers is available.

As the complete data stream is stored in the data storage buffer, the CPU can for instance also recognize the data length, which data belongs to which LED, can decode the data to e.g. commands as previously described, and processes the data further.

A next data frame can be then processed.

If on the other hand ID9=1, the steps of data transmission are triggered, and n bytes according to the available length information will be transmitted 222. First, the TX_Address will be set in DMA_TX 51 from the transmit data storage buffer 54 and indicates the start address of the data field to be transmitted. After each transmitted byte, the byte the TX_Address is increased, and the signals to the UART, e.g. TX_OK (transmission was correct), or TX_REQ (transmission of a byte to the UART requested), are generated accordingly.

The transmitted information can be checked 223 for errors. For example the transmitted bytes at the physical layer, for differential bus 34, may be read back, and compared with the byte stored in the transmit data storage buffer 54. In case of mismatches, an error can be generated, which can be processed 228 further under use of an error routine.

Over the whole data stream (ID field and datafield to be transmitted) a CRC of 16 bits=2 bytes can be generated 224 by the BPPU under use of state of the art methods. This generated CRC (2 bytes) will be transmitted 225 for further processing.

The transmitted information can be again checked 226 for errors, for example as before (the transmitted bytes at the physical layer 34 are read back and compared with the byte stored in the transmit data storage buffer 54, and processing 228 under an error routing can be performed in case of mismatches).

With the end of the data frame, the BPPU might generate 221 signals to the CPU. These signals are for instance an FR Transmitted IRQ interrupt, informing the CPU that a data frame has been transmitted. A next data frame can be processed.

The communication flow further might be observed via a timing unit (55). For example, a time interval can be defined having a minimum and a maximum length. Transmission or reception of a bit, byte or data frame must be performed within the defined time interval. If this time is shorter and/or longer than expected, an error signal can be generated (e.g. by the time unit 55) which can be also handled in an error routine.

The disclosed protocol has several check possibilities included in order to operate robust in the automotive harness. Possible generated errors might be processed 228 further in an error processing step. An error interrupt error IRQ may be generated for instance at the occurrence of an error, which may interrupt the CPU from normal operation and to react on that error.

The errors can be collected in an error register 53, which can be updated at any time an error occurs.

In receive operation, upon generation of error, the slave node might ignore the data frame and might generate an error message to the MCU. In transmit operation, the data frame might be re-sent. The slave node may generate an error message to the MCU.

In one embodiment, the error IRQ is processed immediately when one error occurs. In another embodiment, the error IRQ is processed after a data frame is completed, or after other interrupt instructions with a higher priority are processed.

To control each cluster 38 individually, each controller 20 needs a unique address. This unique address should match to a physical position of each LED unit 11 in the light chain (see FIG. 1) so that the light information given by the MCU 10 arrives on the correct LED unit located in a given physical location in the light chain. E.g. position 1=address 'a', position 2=address 'b', etc.

By way of illustration, an exemplary method for setting and storing the addresses of each slave node is disclosed. In exemplary embodiments of the present invention, the addresses are given by the MCU 10 upon powering up of the network.

The method can be applied to systems of the first aspect of the present invention, in particular to a plurality of LED driving units connected to an MCU. In particular, the LED units may comprise a serial differential communication interface formed by the Diff PHY 34, the UART 32 and the BPPU 33, an input pin AIN for receiving the information that a given slave node is ready to receive an address information to be programmed from the MCU, an output pin AOUT for providing status information (e.g. that the address programming of the given slave node has been done) and a configuration memory (which may be a RAM or a NV memory, for example) to store the address information and an ID flag, when programming has been done. As shown in FIG. 1, the input pin of the 1st slave AIN1 is connected to an active voltage level for programming (e.g. a supply voltage), the output AOUT1 of the 1st slave is connected to the input AIN2 of the 2nd slave and the output AOUT2 of the 2nd slave is connected to the input AIN3 of the 3rd slave and so on, so that the slaves are forming a daisy chain.

In one embodiment (e.g. FIG. 2A, 2B), the addresses as well as the ID flag might be stored by each controller 20 locally in a NV Data memory 30 and might be used then in the application. A removal of supply will not reset the provided addresses.

In another embodiment, these addresses as well as the ID flag can be stored in a volatile manner in e.g. a data storage 29, e.g. a RAM. In that case the unique address assignment must be repeated after each power on of the system.

During a garage operation of the car, a reprogramming of these individual addresses might be needed to be done, thus the address assignment method must be reversible.

The communication interface may always be available between the MCU unit 10 and the controllers 20 of each unit 11 acting as slave node and should not be enabled/disabled during the individual address assignment process, which is advantageous for automotive functional safety related reasons.

Figure 4:
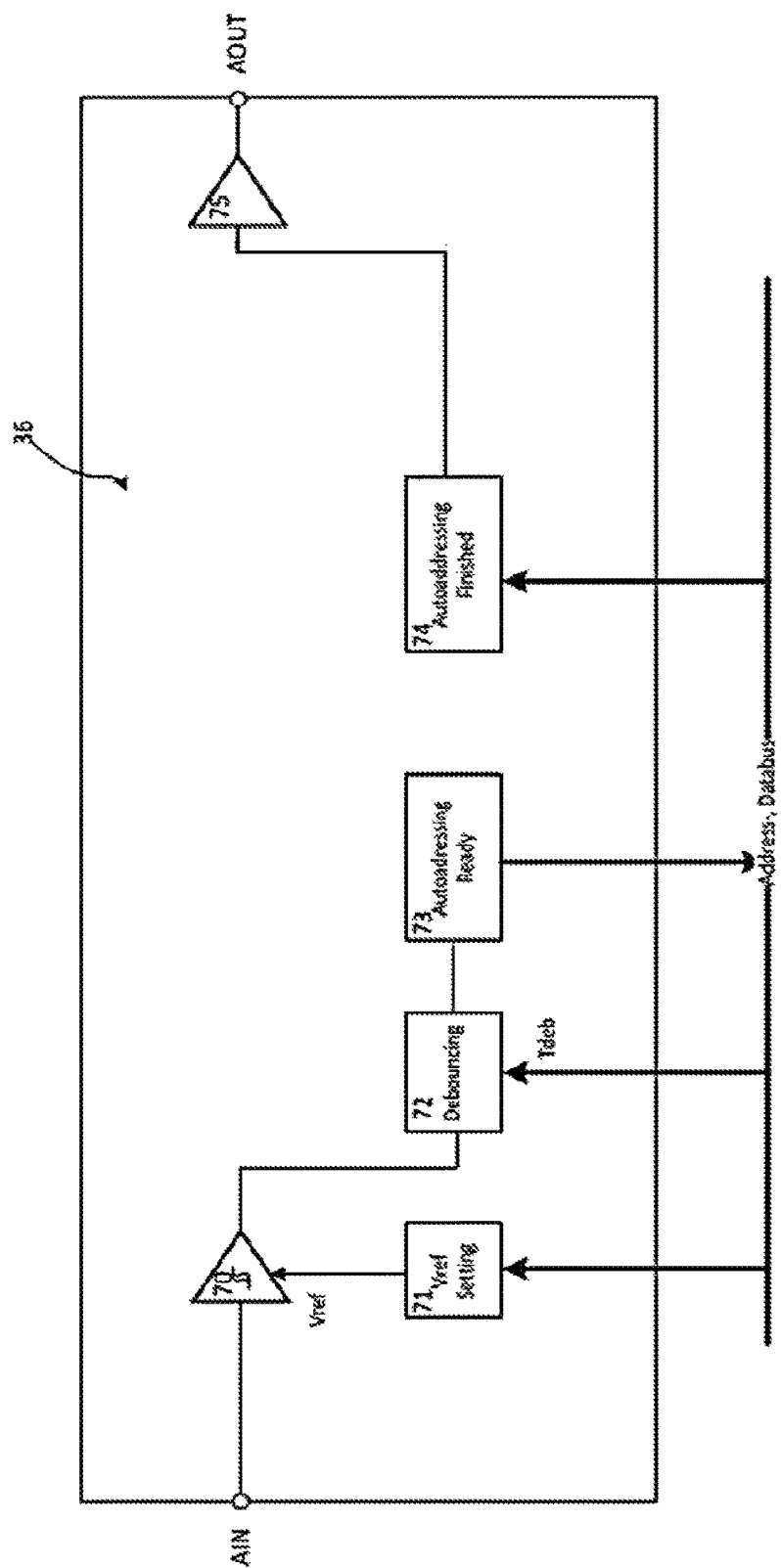
FIG. 4 illustrates a scheme of auto-addressing control according to embodiments of the present invention.

The scheme of FIG. 4 shows an exemplary embodiment of the auto addressing control 36 of FIG. 2A, 2B. The information provided on a pin AIN is read by a comparator 70 which may have adjustable threshold, e.g. by a Schmitt-Trigger, which can be set by the CPU 28 in a register 71. The information is then further given to debouncing unit 72, with an adjustable debouncing time (which can be adjusted by the CPU 28). After a debouncing time, the information arrives in an auto-addressing ready register 73, which can be read by the CPU 28. The CPU 28 can, in turn, write to an auto-addressing finished register 74. This would trigger a pin driver 75 to provide a voltage level to the pin AOUT. This will be read by the controller 20 of a following LED unit 11 as a trigger for starting the same process in that following unit 11.

The pin AIN of the 1st LED unit 11 (and of its corresponding controller 20) is connected to an active voltage level in an external manner, as shown in FIG. 1. Together with a non-programmed ID flag in the NV data memory 30, the address assignment is possible for this 1st LED unit.

In case LED unit are not assigned with an individual address, the ID flags are not programmed and the pins AOUT of these LED unit do not carry an active voltage level, so that address assignment is not possible for these units.

Figure 6:
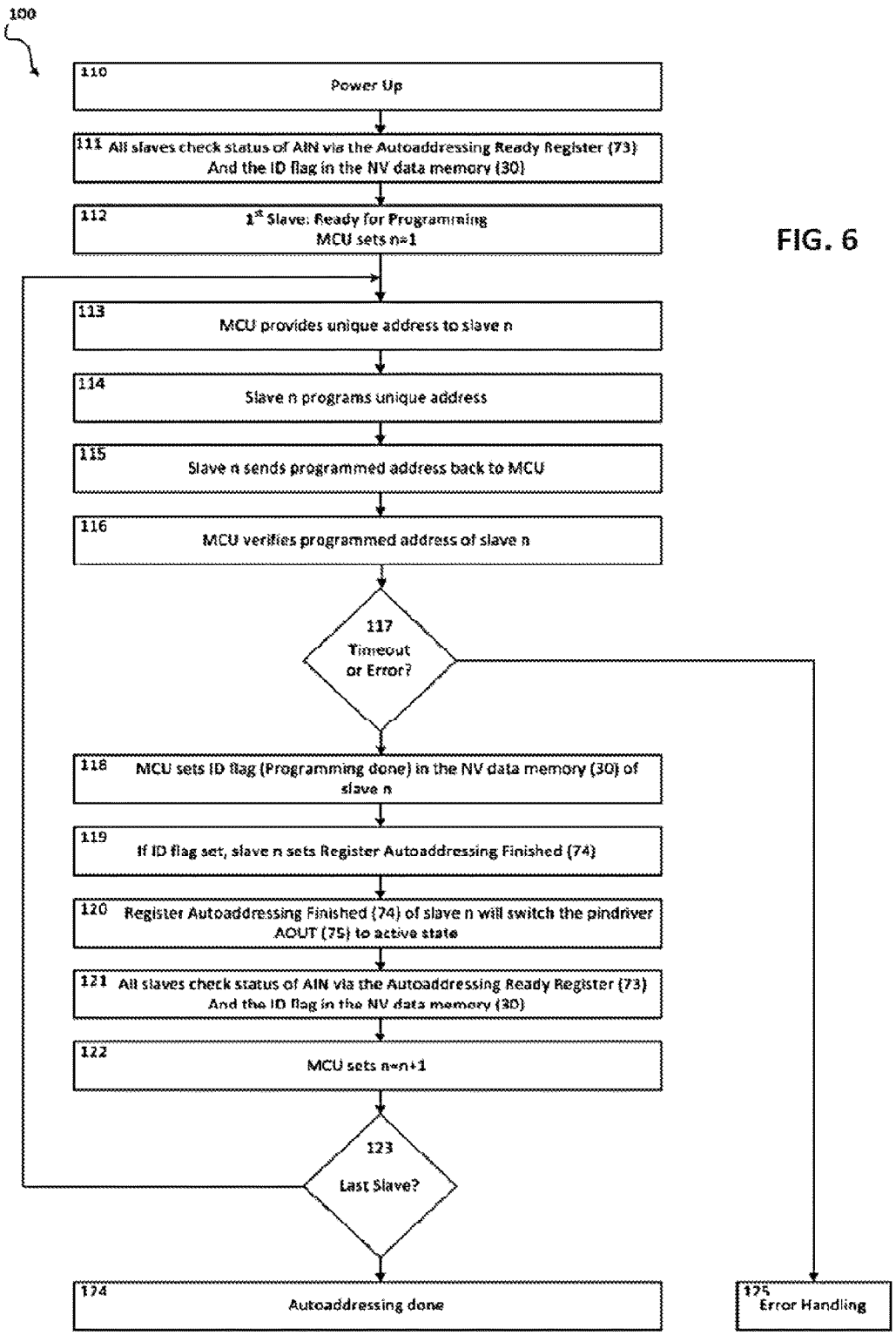
FIG. 6 illustrates a flowchart with the auto-addressing method according to one embodiment of the present invention.

In embodiments of the present invention, shown in FIG. 6, a method 100 is shown for providing a unique address to each slave node (LED driving unit) out of a number of equal slave nodes connected to a single master unit in a network configuration, for example in a daisy chain configuration, via the auto-address connections, as shown in FIG. 1.

First, the network is powered up 110. Afterwards, all slave nodes check 111 the status of their AIN and the ID flag in the NV data memory.

The 1st slave node is automatically in addressing mode, because its input AIN1 has an active voltage level (connected to VSV as shown in FIG. 1) and the ID flag has not been programmed. The MCU sets 112 a general variable or counter n=1, indicating the LED unit under address assignment.

In one embodiment, the slave node n might send a "READY FOR PROGRAMMING" message to the MCU, for example via the bidirectional communication bus.

The MCU sends 113 a unique address to slave node n. Slave node n programs 114 the unique address.

In one embodiment slave node n might transmit 115 its programmed address back to the MCU. The MCU may verify 116 that address.

In another embodiment, the LED unit acting as slave node n may verify the address provided by the MCU versus the programmed address and sends an acknowledge signal to the MCU if the verification was successful, and the MCU checks the presence of such a signal. For example, the autoadressing may be run a single time and the address may be stored in a non-volatile memory (e.g. EEPROM). For a second power up, the master could then detect that the slaves have been programmed correctly, so there is no need for the full auto addressing procedure. Another possibility is to program the slave externally before assembling it into the module. For example, assume that slave number 2 is defect, then the system could be programmed taken this into account.

Any timeout or error is checked 117 at this point. If the programming was not successful during verification, or if the LED unit has not transmitted the programmed address or an acknowledge signal back within a given time, the programming sequence may trigger 125 an error handling routine.

In one embodiment of the error handling the programming might be repeated for LED unit n or for all LED units.

In one embodiment, the MCU might set 118 the ID flag of slave node n to "PROGRAMMING DONE", if the programming was successful.

In another embodiment, the LED unit n might set its ID flag of to "PROGRAMMING DONE", if the programming was successful.

If the ID flag of LED unit n is set to "PROGRAMMING DONE", the CPU of slave node n will set 119 the register autoaddressing finished. This switches 120 the pindriver AOUT to active state, and the LED unit n leaves the programming mode.

All LED units check 121, in a continuous manner, the status of AIN and the ID flags in the NV data memory. A next LED unit detects a valid active voltage level on AIN and checks if the ID flag is not programmed.

The master controlling unit may then increase 122 the counter n to n+1.

The MCU checks 123 whether the last slave is programmed or not. If this condition is reached, the auto-addressing routine is finished 124. Then the MCU might switch the system from auto-addressing into functional mode.

In one embodiment the MCU checks if the LED unit is running on a counter n smaller or equal than a known last LED unit number (or maximum of the counter).

In another embodiment, the "READY FOR PROGRAMMING" message is transmitted by the LED unit n within a time frame. If there is no message within this time frame, the auto-addressing is also interpreted to be finished.

It is an advantage of embodiments that autoaddressing can be used to assign addresses to LED units taking into account their position and masking. For example, it may be needed that two different units are powered up simultaneously, by applying a mask. The MCU may decide to assign appropriate addresses to several LED units so they are affected by the masking.

In some embodiments of the present invention, the length of the network can be taken into account. With long chains of several LED units, voltage drops over the supply lines VS and GND may affect the effective powering of the LEDs. In the typical case, a LED unit contains four clusters (e.g. RGB units), however it also contains a controller which also consumes power. For example, in case several tens of LED units are used, for example 50 LED units, also 50 controllers must be considered. In the typical case that the controller is an ICs, typically with 10 mA operating current per controller, 0.5 A will flow via the supply and GND lines with all LEDs in an "off" state. A typical maximum 50 mA per LED is fixed. Because in this example the network has 50 LED units with 4 LEDs per unit (thus 200 LEDs), a maximum current of 10 A may flow over the chain. The MCU may be adapted to reduce the effect of possible overloads, so the chain might be dimmed down so that a given current (of e.g. max 1.5 A) is not exceeded. Even if the MCU sets the maximum to 1.5 A, in the supply line and GND line, a current of e.g. 0.5 A+1.5 A=2 A may be present, and supposing a reasonable value of wiring harness resistance of e.g. 1 Ohm, it results in a voltage drop of 2V over the full length of light chain. This voltage drop might need to be calibrated. For example, individual calibration of the slave nodes dependent on the physical position of a given slave node in the network can be taken into account in an embodiment of the invention. Such individual calibration can be, for instance, the threshold voltages of the comparators 70 or the debouncing time of the debouncing unit 72. Additionally, individual characteristics of the controllers 20 depending on the physical position in the light chain might be foreseen. For example, the physical layer for differential bus 34 might have a calibration possibility to adjust characteristics of this physical layer.

It is an advantage of embodiments of the present invention that communication is always provided to all slaves and not to only part of the slaves in the daisy chain, which gives advantages in the simplification of the communication protocol regarding malfunction or disturbances against EMC. This also provides functional safety requirements.

A re-initialization of the whole configuration can be done at any time, because the MCU always has access to the ID flags and the AOUT pins of all slave nodes.

The control of the auto-addressing sequence is always provided by the MCU, so that at any time the process might be restarted in case a malfunction is detected.

The invention claimed is:

1. A method of operating a plurality of driving units for powering electronic units, the method comprising interchanging a data frame including a bit sequence, between a master control unit and at least one of a plurality of driving units at slave nodes, the sequence being divided in fields of consecutive bit strings including a first bit string, the method comprising:
   applying an ID field for addressing at least one driving unit, for interchanging data between the master control unit and the at least one addressed driving unit,
   applying a data field comprising information and/or instructions regarding the status of the electronic units,
   wherein applying the ID field further comprises:
   indicating the driving unit address using a first bit sub-string comprising N bits, where $2^N$ is equal or higher than the number of driving units in the plurality of driving units, for applying the data field on the addressed driving unit or ignoring the data field if the driving unit is not addressed;
   using a receive/transmit command bit for assigning values,
      allowing the master control unit to identify whether data should be received from or transmitted to driving units,
      or
      allowing each addressed driving unit to decode which action is required by the master control unit,
      depending on the value assigned to the receive/transmit command bit;
   using a further function bit including information in the ID field regarding the type of instructions included in the data field;
   depending on the value assigned to the function bit, assigning data bits in a second bit sub-string to different electronic units or performing a length decoding step for indicating the length of the first bit string in the data field using the second bit sub-string.

2. The method of claim 1 further comprising including a cyclic redundancy check for detecting any unintentional change of the ID field and data field.

3. The method of claim 1, wherein the master control unit sends the sequence of bits to at least one of the driving units, the sequence including an acknowledgement field comprising a predetermined bit string sent by a slave node to the master control unit immediately before the end of a data frame, for signaling to the master control unit that the received data string is correct if the predetermined bit string coincides with the expected value or values stored in the master control unit.

4. The method of claim 1, the method further comprising an end of frame field being a stop bit of the transmission for signaling the end of the frame and/or the method further comprising applying a break field, before the ID field, with a predetermined length and/or the method further comprising storing a plurality of data frames in different data buffers.

5. The method of claim 1, further comprising addressing every driving unit simultaneously upon interchanging a predetermined sequence or sequences of bits on the first bit sub-string of the ID field and/or the method further comprising ignoring one or more predetermined bits of the address for at least one driving unit of the plurality, for addressing more than one driving unit simultaneously.

6. The method of claim 1, the driving units comprising an input connection and an output connection for receiving address information and provide status information respectively,
wherein the output connection of a driving unit is connected to the input connection of one different driving unit, the input connection of the first driving unit connected to an active voltage, the output connection of the last driving unit of the plurality not being connected, each driving unit further comprising a direct communication bus to the master control unit, the method comprising setting the maximum value of a counter n equal to the number of driving units further comprising the steps:
checking the status of the input connection of a driving unit, corresponding to the value of counter n, and if the status is active:
providing, by the master control unit, a unique address to a driving unit on its corresponding value of counter n, subsequently sending back the address by the driving unit to the master control unit,
verifying the programmed address of the driving unit for the value of counter n, and starting an error handling routine in case there is an error, otherwise:
setting a flag for signaling that the programming is finished for that driving unit on its corresponding value of counter n, subsequently switching the output connection of the driving unit to active state,
increasing the value of the counter n by one,
repeating the steps until the counter n reaches its maximum value.

7. The method of claim 6 further comprising setting the address of a first slave node on a value of 1 for the counter n.

8. The method of claim 1, wherein the method is a method of driving a plurality of driving units for lighting devices and/or for lighting applications in vehicles.

9. A system comprising a plurality of driving units each for driving at least one electronic unit, a master control unit comprising a single communication bus for establishing interchange of data sequences between the master control unit and each of the plurality of driving units, each driving unit being connected in parallel to the same communication bus, the driving unit comprising a controller, the controller further comprising
at least one bus protocol processing unit for processing data interchanged through the communication bus,
at least one control unit for controlling the powering of the electronic units according to any data sequence sent by the master control unit,
the at least one bus protocol processing unit being adapted for processing
an ID field for addressing at least one driving unit, for interchanging data between the master control unit and the at least one addressed driving unit, and
a data field comprising information and/or instructions regarding the status of the electronic units,
wherein the ID field further comprises:
the driving unit address using a first bit sub-string comprising N bits, where $2^N$ is equal or higher than the number of driving units in the plurality of driving units, for applying the data field on the addressed driving unit or ignoring the data field if the driving unit is not addressed;
a receive/transmit command bit that
allows the master control unit to identify whether data should be received or transmitted,
or
allows each addressed driving unit to decode which action is required by the master control unit, depending on the value of the receive/transmit command bit;
a further function bit for including information regarding the type of instructions included in the data field;
a second bit sub-string for assigning data bits to different electronic units or indicating the length of a first bit string in the data field depending on the value assigned in the further function bit.

10. The system of claim 9, wherein the controller further comprises a timing unit for checking the length of any data sequences received from the master control unit and means for generating an error signal if the interchange of data is performed under a predetermined minimum interval of time or over a predetermined maximum interval of time.

11. The system of claim 10, wherein the timing unit is an RC oscillator or may comprise an RC oscillator.

12. The system of claim 9, wherein the master control unit further comprises a common voltage supply line for powering at least one driving unit of the plurality of driving units, the system further comprising at least one protection unit between the at least one driving units and the common voltage supply, for suppressing at least electrostatic discharge on the supply line.

13. The system of claim 9, wherein the single communication bus of the master control unit is a differential communication bus, or
wherein the system further comprises a diagnostics unit for measuring and collecting voltage values from the controller, or
wherein the system comprises a diagnostic unit for measuring and collecting voltage values form the controller and comprises a temperature sensor and/or wherein the driver comprises a processing unit for triggering error handling routines as a response to any error result given by a diagnostics unit.

14. The system of claim 13, wherein the single communication bus of the master control unit is a differential communication bus.

15. The system of claim 13, wherein the system further comprises a diagnostics unit for measuring and collecting voltage values from the controller.

16. The system of claim 13, wherein the system comprises a diagnostic unit for measuring and collecting voltage values form the controller and comprises a temperature sensor and/or wherein the driver comprises a processing unit for triggering error handling routines as a response to any error result given by a diagnostics unit.

17. The system of claim 9, the system being a lighting application in a vehicle and/or the electronic units being LEDs.

18. A non-transitory computer-readable medium having stored thereon executable instructions that when executed by one or more processors configure a system to perform a method of operating a plurality of driving units for powering electronic units based on a bus protocol for interchanging a data frame including a bit sequence, between a master control unit and at least one of the plurality of driving units at slave nodes, the sequence being divided in fields of consecutive bit strings including a first bit string, the method comprising:

applying an ID field for addressing at least one driving unit, for interchanging data between the master control unit and the at least one addressed driving unit, applying a data field comprising information and/or instructions regarding the status of the electronic units, wherein the ID field further comprises:

indicating the driving unit address using a first bit sub-string comprising N bits of the first bit string, where $2^N$ is equal or higher than the number of driving units in the plurality of driving units, for applying the data field on the addressed driving unit or ignoring the data field if the driving unit is not addressed;

using a receive/transmit command bit for assigning values, allowing the master control unit to identify whether data should be received or transmitted, or allowing each addressed driving unit to decode which action is required by the master control unit, depending on the value of the receive/transmit command bit;

using a further function bit including information in the ID field regarding the type of instructions included in the data frame;

assigning data bits in a second bit sub-string of the first bit string to different electronic units or indicating the length of the first bit string in the data field depending on the value assigned in the further function bit.

\* \* \* \* \*